March 20, 1951  C. H. MARTIN  2,545,739
TRACTOR-DRAWN SCRAPER
Filed Sept. 2, 1944  3 Sheets-Sheet 1
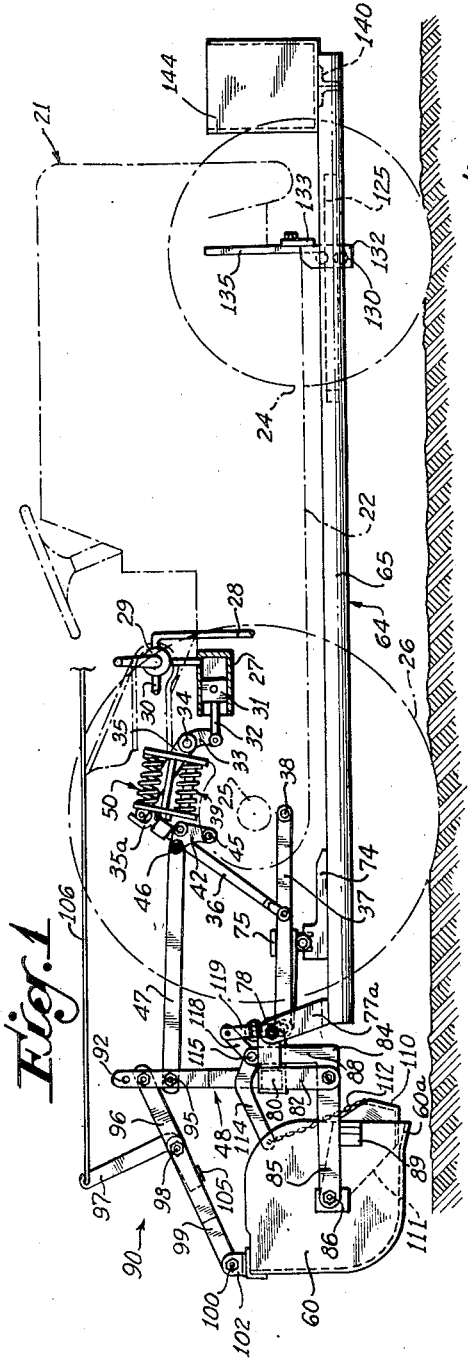
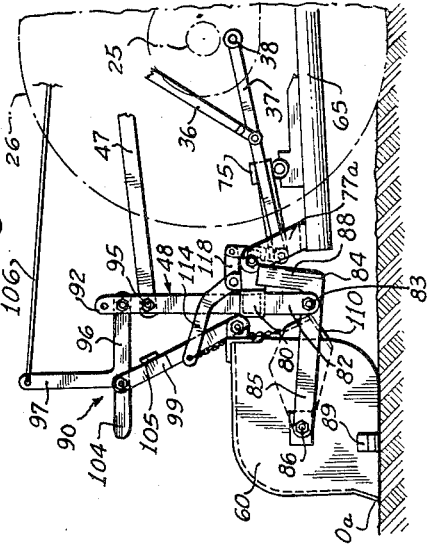
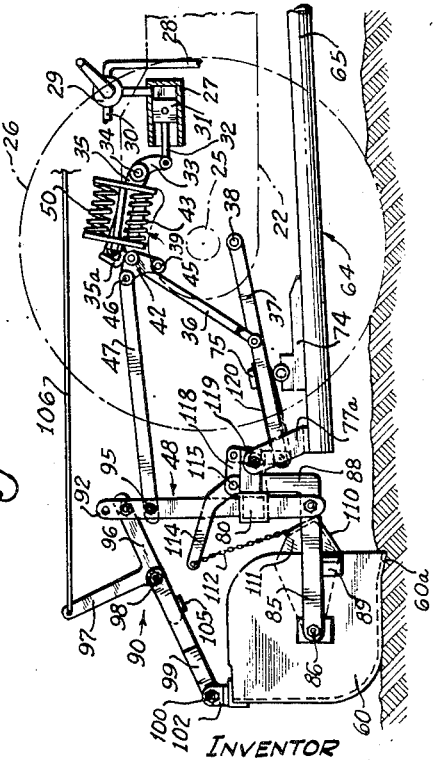
INVENTOR
CHARLES H. MARTIN
BY HARRIS, KIECH, FOSTER & HARRIS
Ward D. Foster
FOR THE FIRM
ATTORNEYS March 20, 1951  C. H. MARTIN  2,545,739
TRACTOR-DRAWN SCRAPER
Filed Sept. 2, 1944  3 Sheets-Sheet 2
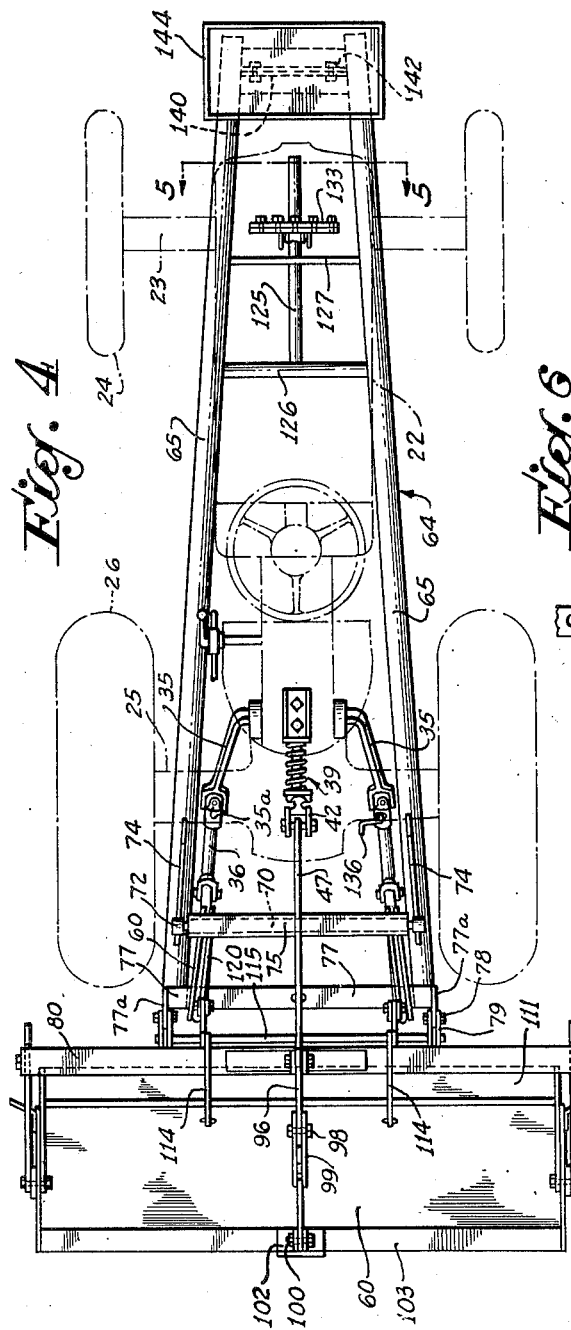
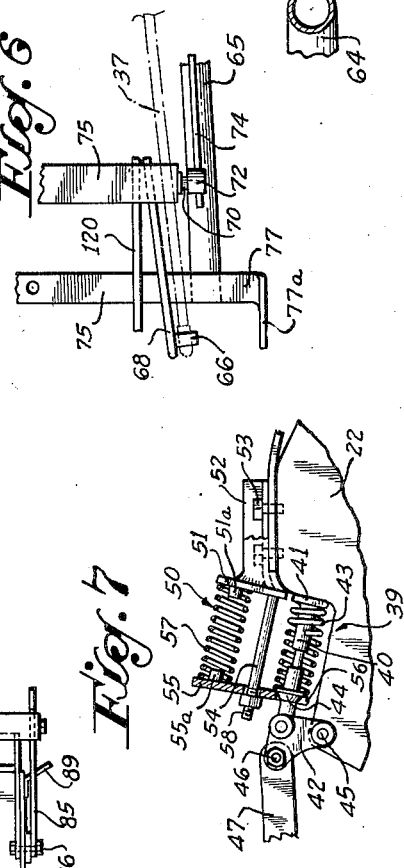
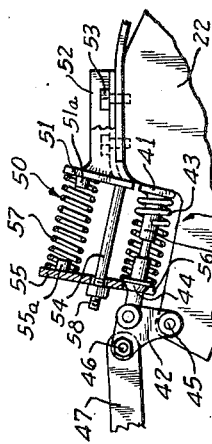
INVENTOR
CHARLES H. MARTIN
HARRIS, KIECH, FOSTER & HARRIS
Ward D. Foster
FOR THE FIRM
ATTORNEYS March 20, 1951 C. H. MARTIN 2,545,739
TRACTOR-DRAWN SCRAPER
Filed Sept. 2, 1944 3 Sheets-Sheet 3
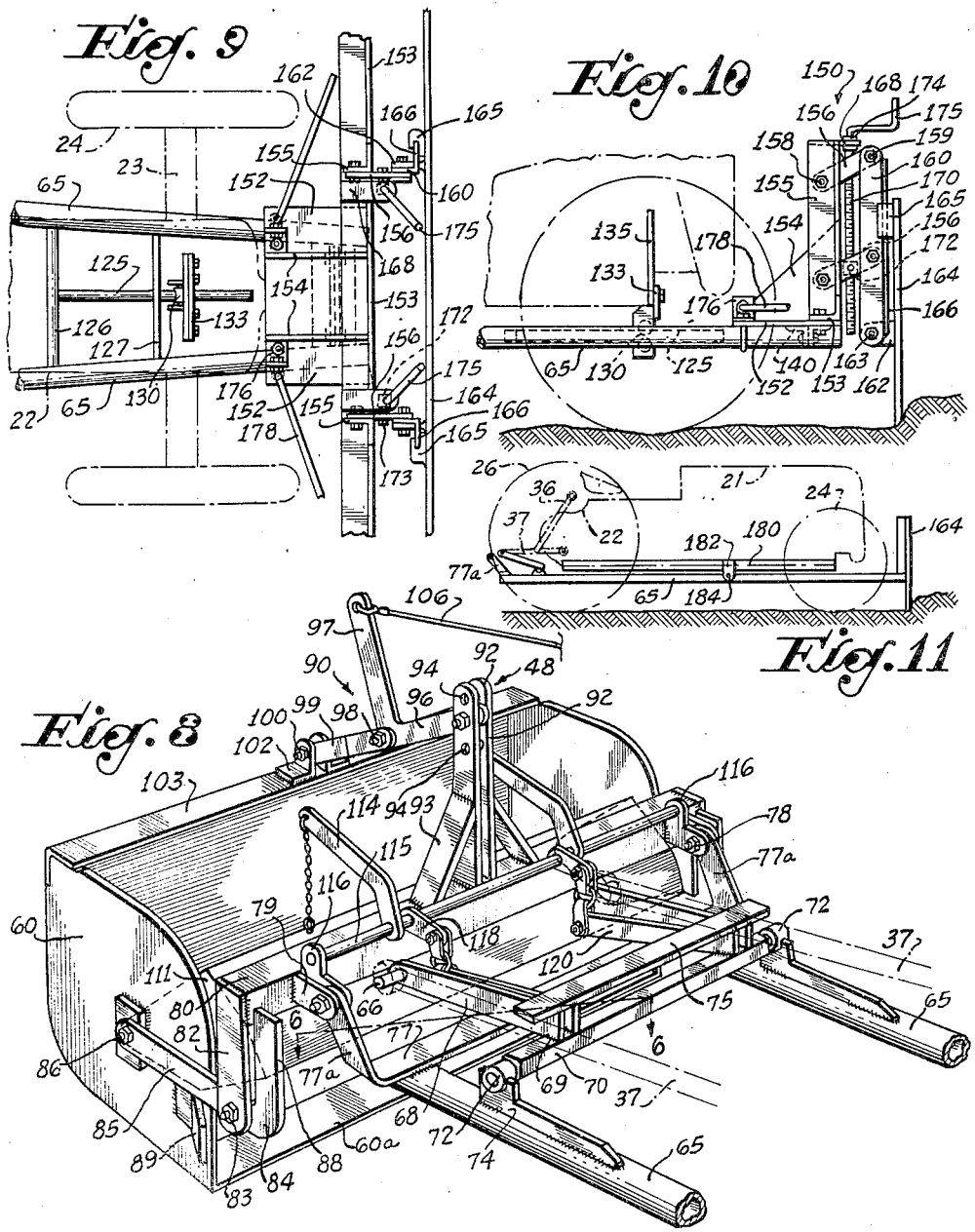
INVENTOR
CHARLES H. MARTIN
BY HARRIS, KIECH, FOSTER & HARRIS
Ward D. Foster
FOR THE FIRM
ATTORNEYS Patented Mar. 20, 1951

2,545,739

UNITED STATES PATENT OFFICE 2,545,739

TRACTOR-DRAWN SCRAPER

Charles H. Martin, Huntington Park, Calif., assignor, by mesne assignments, to Towner Manufacturing Co., Santa Ana, Calif., a partnership Application September 2, 1944, Serial No. 552,494

17 Claims. (Cl. 37—126)

This invention relates to earth-working tools of the scraper type and more especially to scrapers adapted to be drawn by tractors or similar powered vehicles, and to means for carrying and operating scrapers and similar tools which means are adapted to be carried upon and operated by such tractive vehicles.

The general object of the invention is to provide novel and efficient structures for hitching heavy implements of the scraper type to tractors and the like, and to provide novel and efficient means for controlling movements of such a scraper during loading and unloading operations. Other objects are to regulate the depth of cut of scrapers and similar earth-working operations, to secure proper traction of tractive vehicles operating the scrapers and to control the disposition of heavy loads imposed by such devices.

Heretofore, control devices have been combined with tractors for the purpose of automatically controlling the depth of cut of implements drawn by the tractors, and for the purpose of elevating such implements for transportation in operative positions. Linkages have been provided for connecting the tractors and such control devices to the implements, and such linkages have met with some success when applied to conventional light weight implements such as plows. However, for the handling of inherently heavy implements, or implements which are unusually heavy when loaded, such devices have not been entirely satisfactory. Part of this difficulty, so far as the ability to handle heavy loads is concerned, has been a result of long leverages provided for attachment to the implements to be lifted.

It is another object of my invention to provide means which readily adapt the prior controls to handle heavier loads, and, in part, this is accomplished by modifying the linkages and changing bearing points in order to obtain the most favorable leverage conditions with the minimum application of force. Thus, it is an object of the invention to provide hitch devices and supporting structures for unusually heavy implements, or implements which are unusually heavy when loaded, which impose the weight of the load upon the tractive vehicle at the most advantageous locations. Another object of the invention is to provide for balancing of at least a part of the load by some form of counterweighting means. In one form of the invention, the counterweighting means may be a complemental earth-working tool disposed at the forward end of the tractive vehicle, preferably upon a pivoted sub-frame carrying the scraper or other implement drawn by the vehicle.

Another object of the invention is to provide an auxiliary frame or sub-frame adapted for attachment to the tractor or other draft vehicle, which would be the frame-carrying counterweighting means, when the latter is employed, such frame being adapted to carry a scraper or other implement and to be raised and lowered thereby under influence of a hydraulic lifting mechanism or other lifting mechanism standard upon various types of tractors.

A particular object in employing such a sub-frame includes the pivotal mounting of a supporting frame upon such a sub-frame in order that an automatic depth control mechanism may be actuated, the supporting frame in turn carrying a pivotal mounting for a rotating structure such as a rotary bucket scraper, whereby all operations for handling such a scraper may be controlled by the driver of the tractor. A further object is to include closure means for a scraper, and to automatically move said closure means to and from closing position under the influence of the raising and lowering of the sub-frame.

Consequently, it is a more specific object of this invention to provide a tractor-drawn rotary scraper of the bucket type, having a gate or closure, which may be readily supported by a tractor normally adapted for lighter loads, and which may be actuated from the driver's seat to accumulate an unusually heavy load of earth or other material, to elevate the same into a position where it is supported by such a tractor, to transport the same to a dumping location, to spread the load by means of the scraper, a gate for the scraper being automatically opened as the scraper is lowered into dumping and operating position, as well as when it is lowered into loading position, the scraper being readily elevated for transport back to a scraping or excavating location. These objects include the automatic control of depth in order to overcome possible destructive stresses upon the hitch mechanism or the implement or the tractor. These objects also include the provision of mechanism which causes the implement to maintain a constant scraping or excavating depth under uniform conditions, and to return to a predetermined optimum depth following any condition imposing abnormal strains.

Other objects and features of my invention will be apparent from the following description and accompanying drawings, in which drawings various embodiments are illustrated merely by way of example. In the drawings:

Fig. 1 is a side elevation showing the hitch of the present invention mounted upon a tractor and supporting a bucket type scraper in transport position;

Fig. 2 is a corresponding elevation of the rearward portion of the mechanism shown in Fig. 1, the bucket scraper being lowered into scraping position;

Fig. 3 is a similar fragmentary elevation showing the scraper and actuating parts in dumping position;

Fig. 4 is a plan view showing the structure in the position of Fig. 1;

Fig. 5 is principally an elevational detail taken from the line 5—5 of Fig. 4, parts being shown in section;

Fig. 6 is a fragmentary detail in plan showing a portion of the actuating linkage as generally indicated by the line 6—6 of Fig. 8;

Fig. 7 is a fragmentary elevational detail of means modifying the automatic depth control and lifting means on the tractor;

Fig. 8 is a perspective view showing the bucket scraper of Figs. 1 to 4 in the position of Fig. 1 and the means by which it is supported and controlled;

Fig. 9 is an elevation of the forward end of the tractor showing a forward end of the hitch mechanism provided with a pushing implement in the bull-dozer type;

Fig. 10 is a side elevation of the structure shown in Fig. 9; and

Fig. 11 is a side elevation showing a modified mounting for the pushing implement of Figs. 9 and 10.

Referring particularly to the form of the invention illustrated in Figs. 1 to 8, a tractor 21 is indicated in broken lines, this tractor including a frame 22, a front axle 23 on which front wheels 24 are mounted, and a rear axle 25 on which traction wheels 26 are mounted. The tractor shown represents a conventional structure provided with an engine adapted to drive the traction wheels 26 for pulling an implement or other loaded device.

The hitch of this invention may be employed with automatic depth control and elevating mechanisms. The drawings illustrate a known depth control and elevating mechanism as disclosed in the Ferguson Patents Nos. 2,118,180 and 2,118,181, with certain improvements over the structures of those patents. This mechanism includes a cylinder 27 to which fluid under pressure is supplied through a line 28 from a source of supply such as a pump driven by the tractor engine. The flow of fluid through the line 28 is controlled by a manually actuated valve 29 which also controls passage of fluid from the cylinder 27 through a pipe 30 to a suitable storage tank. Mounted for reciprocation in the cylinder 27 is a piston 31 connected by a piston rod 32 to the end of a lever 33 fulcrumed intermediate its ends at a pivot 34. The lever 33 is bifurcated to provide two arms 35 extending rearward from the opposite sides of the pivot 34, the rear end of each arm 35 being pivotally connected as by means of universal joints 35a with a pull rod or lifting rod 36, the lower end of each rod 36 being pivotally mounted upon an intermediate portion of an elevator lever or link 37. The forward end of each elevator lever 37 is pivoted at 38 to the tractor frame 22 at a point adjacent the rear axle 25 or slightly forward thereof.

The automatic depth control mechanism 39, which is best seen in Figs. 1, 2 and 7, includes a telescoping valve member 40 mounted for telescoping movement between a portion 41 of the tractor frame 22 and a bell crank 42 to which one end of the valve member 40 is secured. A compression spring 43 is mounted around the valve member 40 with one end bearing against the frame portion 41 and the other end abutting a collar 44 secured upon the adjacent end of the valve member 40. The spring 43 thus resists the collapsing movement of the telescoping valve member 40.

One arm of the bell crank 42 is pivoted at 45 to the tractor frame 22 and the other arm is pivoted at 46 to one end of a control link 47. The other end of the control link 47 is pivotally secured to the upper end of an upstanding frame or yoke 48 forming part of an implement frame.

When an implement of conventional construction and weight for which the draft control mechanism 39 is designed, is secured to the lower end of the yoke 48, the telescoping valve member 40 operates automatically to provide fluid under pressure to the cylinder 27 when the draft force necessary to draw such an implement exceeds a predetermined value. This supply of fluid to the cylinder 27 swings the arms 35 of the lever 33 forward, thus urging the rearward ends of the elevator levers 37 upwardly to lift the implement and diminish its resistance to forward movement, while at the same time imposing a portion of the weight of the implement upon the rearward end of the tractor 21 and thereby increasing its traction. The mechanism above described and its operation are those of the Ferguson patents previously mentioned.

The spring 43 of the automatic depth control mechanism as customarily employed is made of such resistance to deformation as to be compressed sufficiently to lift automatically implements of conventional construction and weight. This automatic lifting results from the increased resistance to forward motion of the implement, as above indicated, which thereby urges the link 47 forward and causes compression of the spring 43 and telescoping of the valve member 40 to supply the pressure fluid to the cylinder 27 and thus lift the elevator levers 37 and attached implement upwardly through the medium of the lifting rods 36 and the lever 33.

However, in the event that the weight of the implement which is attached to the automatic depth control mechanism, or the moment of such implement exerted upon the depth control mechanism, is greater than the weight or moment of the conventional implement for which the depth control mechanism is designed, as is true of implements which are intended to be used in connection with the present hitch mechanism, it is necessary to apply a compensating force to the spring 43 even though the implement offers a resistance to forward motion substantially equal to the resistance of a conventional implement penetrating the soil to the same depth. Likewise, in the event that there is attached to the tractor and to the depth control mechanism 39 an implement of substantially the same weight as such a conventional implement, but which, due to its type of construction or means of attachment to the tractor or depth control mechanism, offers more resistance to forward motion as when penetrating the soil to a desired depth, than such an instrument of conventional construction, it is necessary to apply a compensating force to the spring 43.

This compensating force shall be of such value that the spring 43, under the varying conditions indicated, will permit movement of the telescoping valve member 40 to control automatically the depth of soil penetration, or other effective load upon the tractor, in the same manner as when such a conventional implement is employed. Such a compensating mechanism is indicated at 50. It includes a plate 51 having formed thereon a bracket 52 secured to the tractor frame 22 as by means of bolts 53. Mounted upon the plate 51 is a pivot pin 54 projecting rearwardly in a position substantially parallel to and above the telescoping valve member 40. A plate 55 is loosely mounted upon the pin 54 and is provided at its lower end with fingers 56 which are disposed about the valve member 40 in contact with the rear side of the collar 44. The fingers 56 are urged forwardly and the upper end of the plate 55 is urged rearwardly by a compression spring 57 retained in place between the plates 51 and 55 by inwardly extending bosses 51a and 55a on the plates 51 and 55, respectively. A nut 58 is threaded upon the pivot pin 54 against the plate 55 so that the plate 55 is caused to compress the spring 43 sufficiently to compensate for increased weight of a heavy implement connected with the depth control mechanism 39 over the weight of a conventional implement connected therewith and for which the standard mechanism 39 is designed.

In the present instance, the heavy implement, for which the depth control mechanism 39 provided with my improvement 50 is intended, is represented by a revolving bucket scraper 60 which necessarily exerts considerable resistance to forward motion as it is being drawn by a tractor for the purposes of cutting earth and filling the bucket, and is necessarily relatively heavy and imposes a relatively great weight upon the tractor when it is lifted for the purpose of transport to a dumping position.

As shown, the scraper 60 is carried on an under-slung sub-frame or lever structure 64 comprising two laterally spaced longitudinally extending level members 65, and the forward portion of the sub-frame 64 is loosely connected under the forward portion of the tractor frame 22 as presently to be described.

Thus, instead of connecting the rearward ends of the elevator levers 37 directly to the scraper structure, they are connected to the sub-frame 64 by having their rear ends pivotally secured on pins 66 carried by the rear ends of return bars or arms 68 whose forward ends are secured at 69 as by welding to a transverse shaft 70, the ends of which shaft 70 are mounted in bearings 72 firmly secured as by welding to brackets 74 welded on the lever members 65. Upon the upper edges of the forward portions of the arms 68 in vertical alignment with the transverse shaft 70, a cross bar 75 is welded with its ends over-hanging the adjacent intermediate portions of the elevator levers 37 in close relationship to the pivotal connection of the lifting rods 36 to the levers 37, in order that the upper edges of the levers 37 may contact the over-hanging ends of the bar 75 for the purpose of lifting the frame members 65 through the medium of the cross bar 75, the arms 68, the transverse shaft 70, the bearings 72, and the brackets 74.

For purposes of attaching and supporting the scraper 60 upon the lever members 65, a stirrup 77 has its main web welded to the upper portions of the rear ends of the sub-frame member 65, the ends 77a of the stirrup 77 being bent upwardly and having their extremities pivotally secured by hinge bolts 78 between pairs of ears 79 welded to the forward face of a hollow, square frame member 80 to the upper face of which is secured the yoke 48. The square, hollow frame member 80 is conveniently formed of a pair of angle irons, and to the ends of this structure there are welded depending arms 82 completing the frame 80. To the lower ends of the arms 82 are pivoted at 83 bracket members 84 having lower arms 85 which extend rearwardly and provide bearings in which the ends of the bucket scraper 60 are pivotally supported at 86. The bracket members 84 have upwardly extending arms 88, the rear edges of whose extremities are adapted to bear upon the forward faces of the frame member 80 to position the scraper 60 and limit its downward movement with respect to the supporting frame member 80.

In this manner the bucket scraper 60 is carried by the rear ends of the sub-frame members 65, the whole scraper unit being adapted to swing about the hinge bolts 78, and the bucket scraper 60 itself being adapted to swing about the pivots 86. In order to retain the bucket 60 in scraping position, its ends are provided with offset stops 89 adjacent the forward edges of the bucket ends so that these stops may strike the under edges of the arms 85.

The bucket scraper 60 is adapted to be revolved about the pivots 86 by means of an over-centered toggle construction 90 secured to the bucket scraper 60 and to the upstanding yoke 48. The yoke 48 comprises two spaced upstanding arms or posts 92 whose lower ends are welded to the hollow frame member 80 and are secured in their upright position by braces 93. The upper ends of the arms 92 are provided with a series of holes 94 and between the arms 92 the rear end of the control link 47 is positioned, a pivot bolt 95 passing through one pair of holes 94 in the arms 92 and through a registering hole in the rear end of the link 47, whereby the entire bucket structure may be rocked about the hinge bolts 78. Also extending between the upper ends of the arms 92 is the forward end 96 of a bent lever 97 forming part of the over-centered toggle 90, the bend of the lever being pivotally connected at 98 between the bifurcated forward end of a link 99 whose rear end is pivoted at 100 between upstanding ears 102 welded to a back rail 103 of the bucket scraper 60. The bent lever 97 is provided with a rearward extension 104 aligned with its arm 96, as best shown in Fig. 3, which extension 104 normally lies between the bifurcations of the link 99 and rests against a stop 105 which spans the bifurcations on their under edges. The upstanding main arm of the bent lever 97 has a draft cable 106 secured thereto which leads forward to the driver's position on the tractor. By drawing upon the cable 106, the toggle structure at 90 is broken so that the extension 104 is drawn out of a position past dead center where it strikes the stop 105, as seen in Figs. 1, 2 and 3, and is caused to assume the position shown in Fig. 3 for the purpose of dumping the bucket.

When the scraper bucket 60 is in its loaded position, as shown in Fig. 1, it is closed by a gate 110 which spans the lower portion of the bucket from one side to the other and has end plates 111 pivoted to the bucket ends on pivots aligned with the pivots 86. The position of the gate 110 is automatically controlled through the medium of chains 112 secured to the upper swinging edge thereof and connected to the rearward ends of arms 114 fixed on a rock shaft 115, as by welding, the shaft 115 being journaled in lugs 116 in any suitable manner preventing longitudinal shift. Also secured to the rock shaft 115, as by welding, is a pair of forwardly directed arms 118 loosely connected by a flexible linkage 119 with a corresponding pair of arms 120 which parallel the return arms 68 and extend forwardly to a position between the transverse shaft 70 and the cross bar 75 to both of which they are fixedly secured by welding. The relation of these arms is best illustrated by the fragmentary plan view of Fig. 6 and the perspective view of Fig. 8.

When the rear ends of the sub-frame members 65 are elevated to elevate the scraper 60 by means of actuation of the lifting rods 36 to rock the elevator levers 37 about their pivots 38, the forward end of the sub-frame 64 swings slightly in a mounting on the forward end of the tractor frame 22. This mounting is accomplished through the medium of an elongated cylindrical pin 125 disposed in a middle position between the forward ends of the frame members 65, its rear end being secured as by means of welding to a cross member 126, and an intermediate portion being secured in a transverse bar 127 disposed between the sub-frame members 65. The forward portion of the pin 125 extending forwardly of the transverse bar 127 passes between two concave rollers 130 positioned between two depending supporting brackets 132 secured to a transverse plate 133 which is in turn adjustably secured for transverse adjustment as by means of bolts 134 and slots 134a to depending arms 135 bolted to the framework 22 of the tractor, as best seen in Fig. 5.

In this manner the sub-frame 64 has a three-point suspension provided by the mounting of the pin 125 between the concave rollers 130 and the connection of the two sub-frame members 65 to the tractor frame 22 at the pivot locations 38 by way of the elevator levers 37 and their connections through the return arms 68, the cross bar 75 and the transverse shaft 70. For purposes of leveling the sub-frame 64, a conventional control 136 may be employed with one of the universal joints 35a connecting the lifting rods 36 with the arms 35 of the lever 33, as shown in Fig. 4.

Inasmuch as the bucket scraper 60 when loaded with earth provides a comparatively heavy load, it is desirable to provide counterbalancing means at the forward end of the tractor 21. This is accomplished by securing a pair of angle irons 140 between the forward extremities of the sub-frame members 65, as by welding the ends of the angle irons to the members 65 and bolting them together back to back as indicated at 142. Upon the supporting means thus provided by the angle irons 140 and the forward ends of the members 65, a counterweighting device 144 is provided. This may be in the form of a suitable permanent counterweight, or it may be in the form of a receptacle into which counterweighting material such as rocks or earth may be placed as desired.

In operation of the structure illustrated in Figs. 1 to 8, a counterweighting material may be provided in a counterweighting receptacle 144 to meet such counterweighting demands as may be imposed when the bucket scraper 60 is loaded with material being moved, and the sub-frame 65 will be properly leveled through actuation of the leveling device 136 at the upper end of one of the lifting rods 36, as shown in Fig. 4.

Assuming a starting position as indicated in Fig. 2 where the scraper bucket 60 is disposed upon the ground, the scraper 60 is ready to be drawn forward by the tractor to fill it with earth, sand or the like. In this position the gate 110 is elevated to free the lower portion of the bucket whose digging lip 60a is directed into the earth. The gate 110 will have been elevated into the position shown in Fig. 2 by lowering the rear ends of the sub-frame members 65, the elevator levers 37 and the return arms 68 and 120 to actuate the rock shaft 115 by depressing the linkage 119 and the arm 118 and thereby raising the arm 114. This result is attained because, as will be noted from an inspection of Fig. 2, the rear ends of the elevator levers 37 are depressed to swing about the pivots 38 and towards the rear ends of the sub-frame member 65 as the latter descend under the manual control of the piston 31 through the valve 29 to permit discharge of pressure fluid from the cylinder 27. When this movement of the elevator levers 37 occurs, the return arms 120 fall and swing on their bearings 72, both the elevator levers 37 and the arms 120 assuming positions at an acute angle to the sub-frame member 65. This position of the parts is not only the position for initiating scraping, but it is also the normal position for storage.

When the parts are in the position of Fig. 2, the lever arm 96 and the link 99 of the over-centered toggle structure 90 serve as a brace to tend to hold the bucket scraper 60 in the position shown in Fig. 2, and thrust imparted to this bracing structure by reason of the resistance to forward movement as the digging lip 60a of the bucket scraper 60 is pulled into the earth, is transmitted through the upstanding arms 92 of the yoke or frame 48 to the link 47 and thence to the automatic depth control mechanism 39, 50. Thus, as the bucket scraper 60 is drawn forward by the tractor, if the resistance to forward movement becomes excessive, as by reason of too great penetration into earth of unusual hardness, the thrust transmitted through the toggle device 90 and the link 47 to the automatic control mechanism, which is accompanied by slight pivotal motion about the hinge bolt 78, causes the pressure fluid in the cylinder 27 to cause automatic movement of the piston 31 and of the lever 33 to lift the sub-frame 64 slightly by means of the lifting rods 36. In this manner excessive strains and excessive resistance to forward movement are overcome.

When the bucket scraper 60 has been filled, it is lifted into the transport position of Fig. 1 by manipulation of the control valve 29 which permits the passage of pressure fluid into the cylinder 27 and thereby causes lifting of the rear ends of the sub-frame members 65 through the pull rods 36, as above-mentioned in connection with the automatic depth control. This lifting movement moves the elevator levers 37 and the return arms 120 to a position of parallelism with the sub-frame members 65, with the result that the rear ends of the levers 37 and the arms 120 are elevated and permit the linkages 119 and the arms 118 to rise, thereby allowing the arms 114 and the gate 110 to descend and close the lower forward portion of the bucket 60.

With the bucket scraper 60 and associated actuating parts in the position of Fig. 1, the load of earth contained in the bucket 60 is then transported to a dumping location. When the dumping location has been reached, the tractor driver pulls the draft cable 106 to break the joint of the toggle structure 90 and initiate rotation of the bucket 60, whereupon the weight of the load causes the bucket 60 and the toggle parts to move into the position of Fig. 3. When desired, the bucket 60 is lowered to the earth's surface, as indicated in Fig. 3, through actuation of the control valve 29 to relieve the fluid pressure in the cylinder 27. This movement is the result of a consequent lowering of the rear ends of the levers 37, the return arms 68, and the sub-frame members 65. The descent of the rear ends of the arms 68 also causes descent of the rear ends of the arms 120 which results in the downward movement of the linkages 119 and the arms 118 to locate the shaft 115 and cause elevation of the arms 114, the chains 112 and the gate 110. When the parts are in this position the bucket scraper 60 may be drawn forward to spread the earth, the gate 110 then being raised out of interfering position. Also, forward movement of the tractor will cause completion of any incomplete rotating movement of the scraper, by reason of the fact that the scraper lip 60a will dig into the earth being spread. At the same time the brackets 84 swing about their pivots 83 to permit the bucket 60 to assume the position shown, this movement of the brackets 84 resulting in view of the greater distance between the forward edge of the bucket and its pivot points 86 than the distance between the bottom of the bucket and the pivot points 86.

Following dumping of the load of earth from the bucket 60, normal operations require the rear end of the sub-frame 64 to be again elevated into the position shown in Fig. 1 for transport of the equipment back to the scraping or excavating location, whereupon all of the parts return to their transport positions shown in Fig. 1, the upstanding arms 88 of the brackets 84 striking the forward face of the frame member 80 to limit bodily descent of the bucket 60, the stops 89 striking the under edges of the arms 85, and the toggle structure 90 assuming the bracing position. When the scraper is again settled into the scraping position of Fig. 2, the resultant lowering of the rear portions of the sub-frame member 65, the levers 37 and the return arms 68 and 120, again raises the gate 110 to admit earth being scraped.

As above described, when scraping or excavation of earth is under way, if the resistance to forward movement becomes excessive, the resultant thrust upon the control arm 47 results in actuation of the depth control mechanism 39, 50 to lift the rear ends of the sub-frame members 65 sufficiently to lift the bucket scraper 60 adequately to overcome excessive resistance. When the accumulated load has been raised to the transport position of Fig. 1, the unusually heavy weight thereof is counter-balanced by means of the counterweight 144 carried on the forward ends of the sub-frame members 65, a portion of this load being also counterweighted by the forward end of the tractor.

With the construction described, unusually heavy loads of earth may be readily handled by tractors which are normally designed for the handling of relatively light weights such as plows, light disk harrows and the like, this being due largely to the more favorable leverage resulting from the placing of the weight on the elevator levers 37 at points closely adjacent the lower ends of the lifting rods 36 by reason of employment of the projecting ends of the cross bar 75 which bear upon the upper edges of the elevator levers 37.

In Figs. 9, 10 and 11, an earth-pushing device 150 is shown mounted upon the forward ends of the sub-frame member 65, this device also desirably acting as a counterweight for the scraper 60. Here, a relatively heavy frame is employed which comprises a base plate 152 secured across the forward ends of the sub-frame members 65 and upon the connecting angle irons 140, upstanding frame members 153 being carried upon the forward edge of the plate 152. Brace plates 154 are shown which insure proper positioning of the upstanding frame 153 with respect to the base plate 152. The frame 153 includes spaced flanges 155 to which supporting arms 156 are pivotally secured at 158, the forward ends of these arms being in turn pivotally secured at 159 to spaced upstanding guide rails 160 of angle iron construction. The lower ends of the guide rails 160 have ears 162 pivotally mounted thereon at 163, and these ears 162 are secured to the back of an upstanding elongated wall 164 which constitutes the pusher member. At an elevated position on the pusher member 164 guides 165 are secured on the back thereof to engage the offset flanges 166 of the angle iron rails 160. The frame 153 carries at the top thereof spaced overhanging ears 168 in which are secured the upper ends of jack screws 170 whose lower threaded portions pass through internally threaded blocks 172 pivotally secured at 173 to intermediate portions of the lower supporting arms 156. The upper ends of the jack screws are provided with bearings 174 in the ears 168 which resist longitudianl movement of the jack screws. Handles 175 serve to adjust the positions of the blocks 172, thereby adjusting the positions of the supporting arms 156, the rails 160, and the pusher wall 164. Carried at the rear edge of the base plate 152 are lugs 176 to which are secured bracing struts 178 which extend laterally and forwardly to brace the frame 153 and the pusher wall 164 as may be desired.

The pusher device 150 of Figs. 9, 10 and 11 may be employed in conjunction with the bucket scraper 60 for the spreading of earth which has been dumped, or for the accumulation of earth which is to be moved by the scraper 60. In addition to the relatively permanent adjustment of the pusher wall 164 through the medium of actuation of the jack screws 170, the elevation of the lower edge of the pusher wall 164 may be automatically controlled by raising and lowering the rear ends of the sub-frame members 65 through the hydraulic system above described which is controlled by the valve 29. Thus, if the rear ends of the sub-frame members 65 are elevated, the lower edge of the pusher wall 164 is lowered. If desired, a greater amount of adjustment of the pusher wall 164 vertically may be accomplished, as shown in Fig. 11, by moving rearwardly the pivot point represented by the concave rollers 130 of the other forms. Thus, suitable frame members 180 may be provided on the tractor 21, and to their intermediate portions depending brackets 182 may be secured, the lower ends of these brackets having the sub-frame members 65 pivotally mounted thereon as indicated at 184. Thus, as the rear ends of the sub-frame member 65 are raised and lowered by means of the hydraulic control valve 29, a greater amount of vertical adjustment of the pusher wall is obtained than with the forward mounting of the sub-frame 64 as in Figs. 1 and 10.

While I have shown various embodiments which the various phases of my invention may assume, these are, however, to be taken only as illustrative, it being understood that all variations which fall within the scope of the appended claims are reserved.

I claim as my invention:

1. In an implement and a hitch therefor, the hitch being adapted for connection to a tractor having a power lift mechanism for lifting and lowering the implement, the combination of: a frame adapted for connection with the tractor; means for connecting the frame with the tractor including a linkage for connecting a rear portion of the frame with the lifting mechanism; a scraper pivotally carried on the rear of said frame, a gate for said scraper; and means connecting said gate with said linkage for movement of said gate to and from closing position with respect to said scraper as the rear portion of said frame is raised and lowered by the elevating mechanism.

2. In a structure for drawing a trailing drag device by a pulling device, the combination of: a sub-frame; means for attaching a rearward portion of said sub-frame to a rearward portion of the pulling device; means for connecting a forward portion of said sub-frame to a forward portion of the pulling device; an implement-supporting frame pivotally carried on the rear of said sub-frame; means for pivotally mounting and carrying an implement bodily on said supporting frame and including a rocking bracket pivoted on said supporting frame and to said implement; and means adapted for connection with said pulling device and connected with said sub-frame for lifting and lowering the rearward portion of said sub-frame.

3. A combination as in claim 2 including means for connecting an upper portion of said implement-supporting frame to said pulling device.

4. In an implement and hitch for connecting the implement to a tractor having a power lift mechanism for lifting the implement, the combination of: a linkage for connecting the implement and mechanism whereby the implement may be lifted and lowered by the mechanism and drawn by the tractor; a sub-frame connected with said linkage and extending forwardly therefrom, and connected with said tractor; an implement-supporting frame pivoted on said sub-frame; a rotary scraper pivotally carried on said supporting frame; a movable closure adapted to close and open said scraper; and means connected with said linkage for automatically moving said closure to and from closing position as said scraper is raised and lowered.

5. A combination according to claim 4, and means for imparting rotary motion to said scraper and for locking said scraper against rotary motion.

6. A combination according to claim 4 including: means for imparting rotary motion to said scraper to move the same to and from a dumping position.

7. In combination: a sub-frame adapted for attachment to a tractor; means for pivotally connecting the forward end of said frame to a forward portion of a tractor; an implement-supporting frame carried by the rear end of said sub-frame; a movable implement carried by said supporting frame; a closure for said movable implement; an arm having its forward portion pivotally secured to a rear portion of said sub-frame; a pivotal connection upon the rear end of said arm adapted to receive the rear end of an elevator lever carried by a tractor; an overhanging bearing carried by the forward end of said arm adapted to engage an upper side of said elevator lever whereby lifting and lowering means connected with said elevator lever will lift and lower the rear end of said sub-frame by means of said overhanging bearing, the rear end of said arm approaching the rear end of said sub-frame as the latter is lowered; and a linkage connected with said arm at a position adjacent the rearward end of said arm for opening and closing said closure as the rearward end of said arm is lowered and raised.

8. A combination according to claim 7 wherein the linkage for actuating said closure comprises a rock shaft and lever arms secured thereto and connected with said closure.

9. In a device for attachment to a tractor having power lift mechanism, the combination of: a sub-frame having a forward portion provided with means for moving connection with a forward portion of the tractor, the sub-frame also having a rearward portion; a link having a rearward end connected with said rearward portion of the sub-frame and having a forward end adapted to be connected with the tractor for forward draft of the sub-frame by the tractor; lifting means connected with an intermediate portion of said link and adapted for connection with said lifting mechanism to lift the rearward portions of said link and sub-frame; a supporting frame on said sub-frame, said supporting frame upstanding from said sub-frame; means connecting the upper portion of said sub-frame with said power lift mechanism to control the latter; and an earth-working implement on said supporting frame.

10. In combination in an earth-working device for tractors having power lift mechanism: a sub-frame adapted to be attached to a tractor and to be connected to said power lift mechanism for raising and lowering thereby; an implement-supporting frame carried by said sub-frame and having bearing faces; means for maintaining the relative position of said supporting frame with respect to the vertical; and angular bracket means pivoted on said supporting frame and having arms adapted to support an earth-working implement in rearwardly spaced position, said bracket means having arms adapted to bear against said bearing faces to limit movement and position an implement carried by said bracket means.

11. In combination: a sub-frame having side members adapted to extend longitudinally beneath a tractor; means connected with the rear portion of each side member for separately pivotally connecting the respective side member to the rear portion of the tractor to provide two points of suspension and whereby the rear of said frame may be raised and lowered by power mechanism on the tractor; means on the forward portion of said frame providing a single rocking point of attachment to mount said frame at a fixed position on a forward portion of the tractor, thereby providing three points of attachment in combination with said means for pivotally mounting the rear portions of said side members; an implement-supporting frame carried by one end of said sub-frame; and means provided at the end of said sub-frame opposite from said implement-supporting frame for partially counterbalancing an implement carried by said supporting frame.

12. A combination as in claim 11 wherein said sub-frame extends rearwardly from said tractor and said implement-supporting frame is carried on such rearwardly extending portion of said sub-frame.

13. A combination as in claim 11 wherein said implement supporting frame is movably carried by said sub-frame, and jackscrew means is carried by said frame for vertically adjusting the position of said implement.

14. In a device for attachment to a tractor having power lift mechanism, the combination of: a frame having a forward portion provided with means for moving connection with a forward portion of the tractor, the frame also having a rearward portion; a link having a rearward end connected with said rearward portion of said frame and having a forward end adapted to be connected with the tractor for forward draft of the frame by the tractor; lifting means connected with an intermediate portion of said link and adapted for connection with said lifting mechanism to lift the rearward portions of said link and frame; a rotary earth-working implement on said frame; and means bracing said implement against said rotation, said bracing means including a portion connected with said power lift mechanism to cause actuation of the latter upon excessive resistance of the implement to forward movement.

15. In a device for attachment to a tractor having power lift mechanism, the combination of: a frame having a forward portion provided with means for moving connection with a forward portion of the tractor, the frame also having a rearward portion; a link having a rearward end connected with said rearward portion of said frame and having a forward end adapted to be connected with the tractor for forward draft of the frame by the tractor; lifting means connected with an intermediate portion of said link and adapted for connection with said lifting mechanism to lift the rearward portions of said link and frame; a scraper mounted upon said frame, said scraper having a movable gate; and a movable connection between said gate and said link, said connection causing lowering of the rear end of said link to lift said gate.

16. In a device for attachment to a tractor having power lift mechanism, the combination of: a frame having a forward portion provided with means for moving connection with a forward portion of the tractor, the frame also having a rearward portion; a link having a rearward end connected with said rearward portion of said frame and having a forward end adapted to be connected with the tractor for forward draft of the frame by the tractor; lifting means connected with an intermediate portion of said link and adapted for connection with said lifting mechanism to lift the rearward portions of said link and frame; a scraper mounted upon said frame and having a movable gate; and a moving connection mounted on said frame and connecting said gate with said link to cause said gate to be opened when the rearward portions of said link and said frame are lowered.

17. In a device for attachment to a tractor having power lift mechanism, the combination of: a frame having a forward portion provided with means for moving connection with a forward portion of the tractor, the frame also having a rearward portion; a link having a rearward end connected with said rearward portion of said frame and having a forward end adapted to be connected with the tractor for forward draft of the frame by the tractor; lifting means connected with an intermediate portion of said link and adapted for connection with said lifting mechanism to lift the rearward portions of said link and frame; and means on the forward portion of said frame for counter-weighting said implement.

CHARLES H. MARTIN.

REFERENCES CITED

The following references are of record in the file of this patent:

UNITED STATES PATENTS

| Number | Name | Date |
| --- | --- | --- |
| 766,590 | Burdick | Aug. 2, 1904 |
| 1,535,384 | Toney | Apr. 28, 1925 |
| 1,831,222 | Andersen et al. | Nov. 10, 1931 |
| 1,999,189 | Gustafson | Apr. 30, 1935 |
| 2,273,875 | Livesey et al. | Feb. 24, 1942 |
| 2,295,850 | King | Sept. 15, 1942 |
| 2,308,590 | Douthitt | Jan. 19, 1943 |
| 2,329,210 | McGee | Sept. 14, 1943 |
| 2,350,327 | Ender | June 6, 1944 |
| 2,352,466 | Arps | June 27, 1944 |